(12) United States Patent
Wu

(10) Patent No.: US 12,689,615 B2
(45) Date of Patent: Jul. 21, 2026

(54) DATA PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Yi Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 100 days.

(21) Appl. No.: 18/752,578

(22) Filed: Jun. 24, 2024

(65) Prior Publication Data

US 2024/0348588 A1 Oct. 17, 2024

Related U.S. Application Data

(63) Continuation of application No. PCT/CN2023/095501, filed on May 22, 2023.

(30) Foreign Application Priority Data

May 31, 2022 (CN) .......................... 202210619420.2

(51) Int. Cl.
*H04L 9/40* (2022.01)
*H04L 9/08* (2006.01)
(Continued)

(52) U.S. Cl.
CPC ........ *H04L 63/0428* (2013.01); *H04L 9/0838* (2013.01); *H04L 9/3073* (2013.01); *H04L 9/3297* (2013.01)

(58) Field of Classification Search
CPC . H04L 63/0428; H04L 9/0838; H04L 9/3073; H04L 9/3297
(Continued)

(56) References Cited

U.S. PATENT DOCUMENTS 9,654,450 B2 * 5/2017 Ford ........................ H04L 63/10
10,572,684 B2 * 2/2020 LaFever .................... H04L 9/16
(Continued)

FOREIGN PATENT DOCUMENTS

CN 111460475 A 7/2020
CN 111478911 A 7/2020
(Continued)

OTHER PUBLICATIONS

The European Patent Office (EPO) The Extended European Search Report for U.S. Appl. No. 23/815,001.5 Feb. 27, 2025 8 Pages.
(Continued)

*Primary Examiner* — Samson B Lemma
(74) *Attorney, Agent, or Firm* — Anova Law Group, PLLC

(57) ABSTRACT

A data processing method includes obtaining target object data including an object identifier, and encryption instructions for the target object data; de-identifying the object identifier by using the encryption instructions, to obtain a fake identifier corresponding to the object identifier; encrypting a data content of the target object data based on the encryption instructions, to generate an encrypted content of the data content; and transmitting, to a data receiver, encrypted data of the target object data generated based on the encrypted content and the fake identifier, so that the data receiver decrypts the encrypted data based on a data usage scenario of the target object data and obtains corresponding decrypted data.

19 Claims, 6 Drawing Sheets

(51) Int. Cl.
    *H04L 9/30*         (2006.01)
    *H04L 9/32*         (2006.01)
(58) Field of Classification Search
    USPC ........................................................ 713/160
    See application file for complete search history.

(56) References Cited

U.S. PATENT DOCUMENTS

| | | | | |
|---|---|---|---|---|
| 10,979,904 B2 * | 4/2021 | Kim | ...................... | H04W 12/03 |
| 11,128,609 B1 * | 9/2021 | Feinberg | ................... | H04L 9/14 |
| 11,477,025 B1 * | 10/2022 | Valkaitis | ............... | H04L 9/0618 |
| 11,646,869 B1 * | 5/2023 | Tamosiunas | .......... | H04L 9/0822 |
| | | | | 713/171 |
| 2002/0027992 A1 * | 3/2002 | Matsuyama | .......... | H04L 9/3247 |
| | | | | 348/E7.071 |
| 2002/0035687 A1 * | 3/2002 | Skantze | ............... | H04L 9/0866 |
| | | | | 713/168 |
| 2003/0023845 A1 * | 1/2003 | VanHeyningen | ..... | H04L 63/166 |
| | | | | 713/151 |
| 2007/0189524 A1 * | 8/2007 | Rogaway | .............. | H04L 9/3242 |
| | | | | 380/37 |
| 2007/0234069 A1 * | 10/2007 | Ginter | ................ | H04N 21/4405 |
| | | | | 713/189 |
| 2013/0042112 A1 | 2/2013 | Spector | | |
| 2018/0144152 A1 * | 5/2018 | Greatwood | ........... | H04L 63/123 |
| 2018/0150641 A1 * | 5/2018 | Greatwood | ........... | H04L 9/0643 |
| 2018/0198606 A1 * | 7/2018 | Le Saint | ................... | H04L 9/14 |
| 2019/0130082 A1 | 5/2019 | Alameh et al. | | |
| 2021/0256146 A1 * | 8/2021 | Greatwood | ......... | G06F 21/6218 |
| 2022/0109661 A1 * | 4/2022 | Feinberg | ............. | H04L 63/0435 |
| 2022/0209945 A1 * | 6/2022 | Li | ......................... | H04L 9/0863 |
| 2022/0385644 A1 * | 12/2022 | Puzeris | ................. | G06F 21/445 |

FOREIGN PATENT DOCUMENTS

| | | | | | |
|---|---|---|---|---|---|
| CN | 113282959 A | | 8/2021 | | |
| CN | 113704816 A | * | 11/2021 | ............. | G06F 18/23 |
| CN | 113904832 A | | 1/2022 | | |
| CN | 114428973 A | | 5/2022 | | |
| CN | 114491637 A | | 5/2022 | | |
| CN | 115118458 A | | 9/2022 | | |
| WO | 2017213281 A1 | | 12/2017 | | |
| WO | 2022022009 A1 | | 2/2022 | | |

OTHER PUBLICATIONS

The World Intellectual Property Organization (WIPO) International Search Report for PCT/CN2023/095501 Aug. 29, 2023 5 Pages (including translation).

The State Intellectual Property Office of the People's Republic of China (SIPO) Office Action 1 for 202210619420.0 Feb. 29, 2024 6 Pages (including translation).

\* cited by examiner

Pre-negotiation stage

De-identification stage

Data transmission stage
(transmitting and receiving)

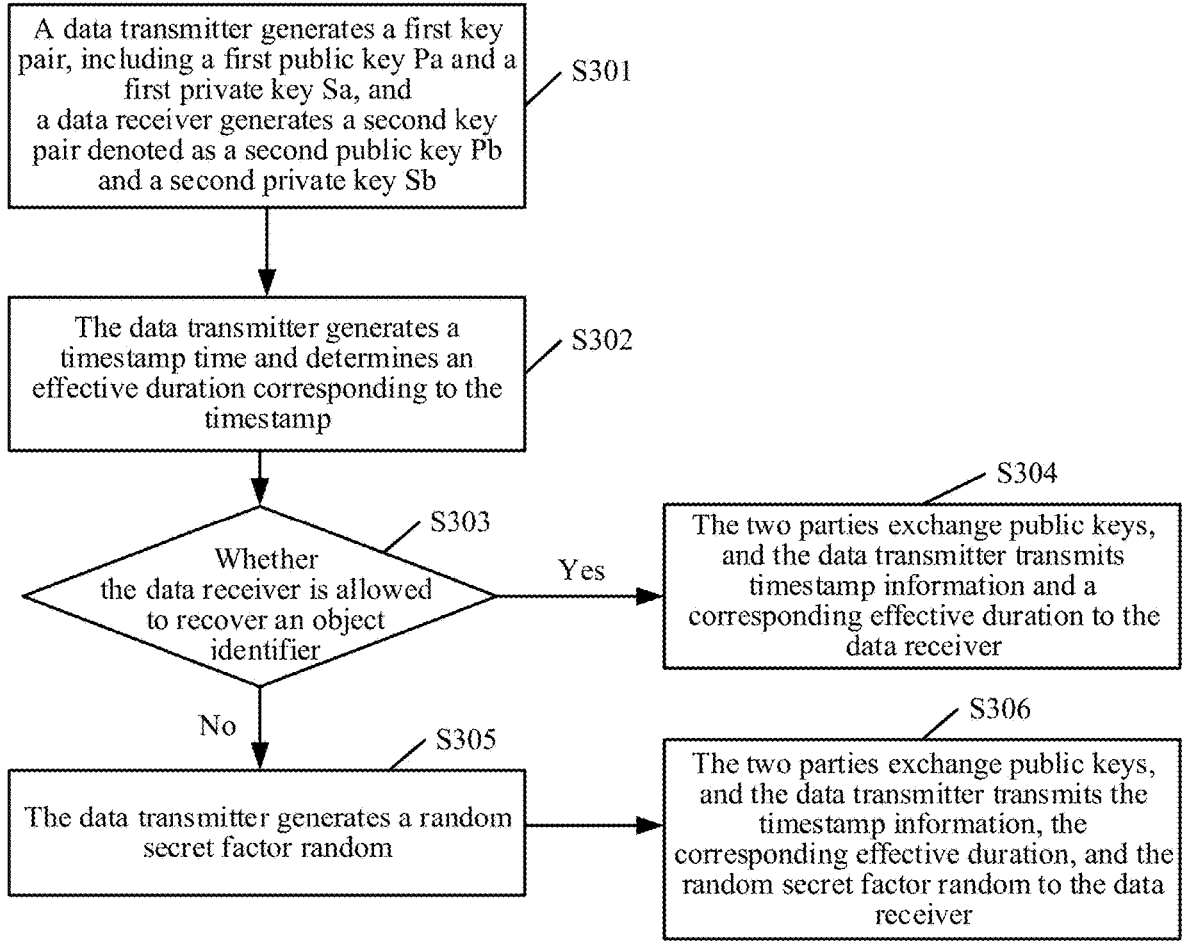

A data transmitter generates a first key pair, including a first public key Pa and a first private key Sa, and a data receiver generates a second key pair denoted as a second public key Pb and a second private key Sb — S301

The data transmitter generates a timestamp time and determines an effective duration corresponding to the timestamp — S302

S303
Whether the data receiver is allowed to recover an object identifier

Yes

S304
The two parties exchange public keys, and the data transmitter transmits timestamp information and a corresponding effective duration to the data receiver No S305
The data transmitter generates a random secret factor random S306
The two parties exchange public keys, and the data transmitter transmits the timestamp information, the corresponding effective duration, and the random secret factor random to the data receiver

FIG. 3A

DATA PROCESSING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2023/095501, filed on May 22, 2023, which claims priority to Chinese Patent Application No. 202210619420.2, filed on May 31, 2022, all of which is incorporated herein by reference in their entirety.

FIELD OF THE TECHNOLOGY

The present disclosure relates to the field of computer technologies and, in particular, to a data processing method and apparatus, a computer device, and a storage medium.

BACKGROUND OF THE DISCLOSURE

With the continuous development of computer technologies, an era of big data has emerged. However, based on different business requirements, data transmission across domains needs to be performed between different data owners to ensure fast and effective execution of business. During current data transmission, especially during transmission of object data related to an object (e.g., a corresponding user), how to effectively ensure the object data of the related object and its data security has become a hot research issue.

SUMMARY

One embodiment of the present disclosure provides a data processing method. The method includes obtaining target object data including an object identifier, and encryption instructions for the target object data; de-identifying the object identifier by using the encryption instructions, to obtain a fake identifier corresponding to the object identifier; encrypting a data content of the target object data based on the encryption instructions, to generate an encrypted content of the data content; and transmitting, to a data receiver, encrypted data of the target object data generated based on the encrypted content and the fake identifier, so that the data receiver decrypts the encrypted data based on a data usage scenario of the target object data and obtains corresponding decrypted data.

Another embodiment of the present disclosure provides a computer device. The computer device includes at least one processor, an input device, an output device, and a memory. The at least one processor, the input device, the output device, and the memory are connected to each other, the memory being configured to store a computer program, the computer program comprising a program instruction, and the at least one processor being configured to invoke the program instruction to perform: obtaining target object data including an object identifier, and encryption instructions for the target object data; de-identifying the object identifier by using the encryption instructions, to obtain a fake identifier corresponding to the object identifier; encrypting a data content of the target object data based on the encryption instructions, to generate an encrypted content of the data content; and transmitting, to a data receiver, encrypted data of the target object data generated based on the encrypted content and the fake identifier, so that the data receiver decrypts the encrypted data based on a data usage scenario of the target object data and obtains corresponding decrypted data.

Another embodiment of the present disclosure provides a non-transitory computer-readable storage medium containing a computer program, the computer program comprising a program instruction that, when being executed, causes one or more processors to perform: obtaining target object data including an object identifier, and encryption instructions for the target object data; de-identifying the object identifier by using the encryption instructions, to obtain a fake identifier corresponding to the object identifier; encrypting a data content of the target object data based on the encryption instructions, to generate an encrypted content of the data content; and transmitting, to a data receiver, encrypted data of the target object data generated based on the encrypted content and the fake identifier, so that the data receiver decrypts the encrypted data based on a data usage scenario of the target object data and obtains corresponding decrypted data.

BRIEF DESCRIPTION OF THE DRAWINGS

To describe technical solutions of embodiments of the present disclosure more clearly, the following briefly describes the accompanying drawings required for describing the embodiments. Apparently, the accompanying drawings in the following description are some embodiments of the present disclosure, and a person of ordinary skill in the art may still derive other accompanying drawings from these accompanying drawings without creative efforts.

FIG. 3A is a schematic diagram of a pre-negotiation stage according to an embodiment of the present disclosure.

DESCRIPTION OF EMBODIMENTS

Figures 1A, 1B:
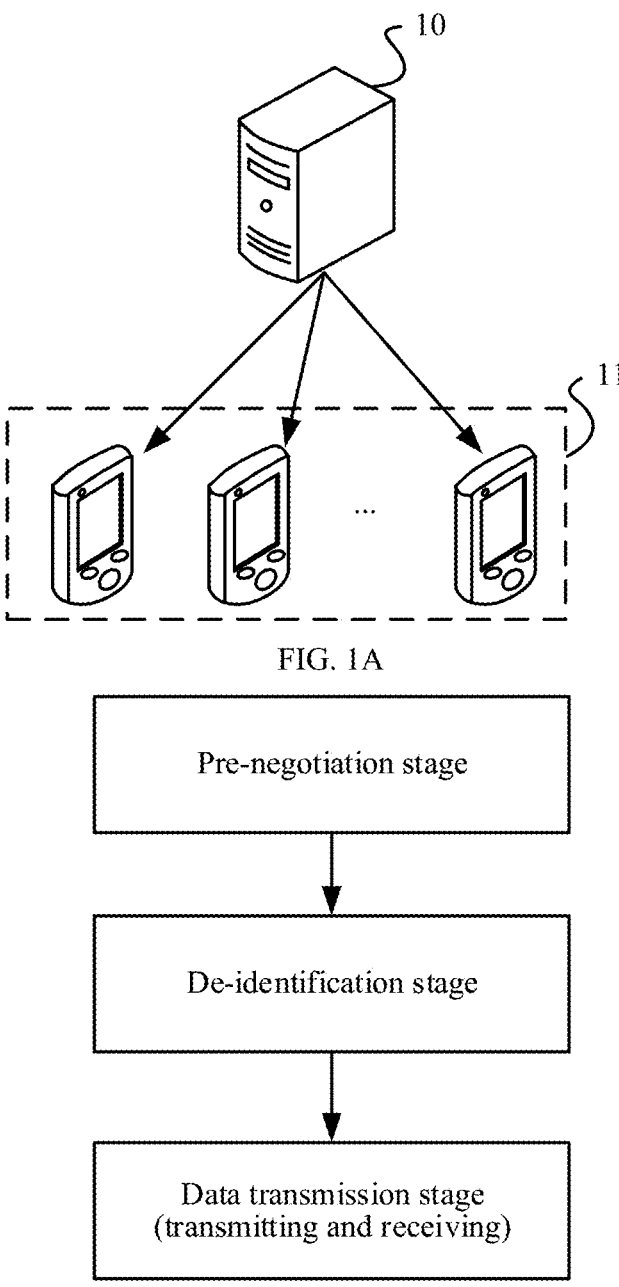
FIG. 1A is a schematic diagram of a data processing scenario according to an embodiment of the present disclosure.
FIG. 1B is an overall flowchart of a data processing method according to an embodiment of the present disclosure.

Embodiments of the present disclosure provide a data processing method, so that when a computer device encrypts target object data including an object identifier, a data transmitter and a data receiver corresponding to the target object data may negotiate a shared secret respectively based on identity information of the data transmitter and identity information of the data receiver. The shared secret includes encryption instructions for the target object data and decryption instructions for the target object data. However, since generation of the shared secret is based on the identity information of both the data transmitter and the data receiver, a process of encrypting/decrypting the target object data based on the shared secret can only be performed on the corresponding data transmitter and data receiver, which effectively improves data security of the target object data. In addition, after the computer device negotiates the shared secret, during the encryption of the target object data based on the encryption instructions in the shared secret, the object identifier included in the target object data is de-identified based on the encryption instructions, and a data content included in the target object data is encrypted based on the encryption instructions. Based on the de-identification of the object identifier, transmission security of the object identifier corresponding to the target object data may be effectively guaranteed. After the object identifier is de-identified, the computer device implements integration of the de-identification process and the encryption transmission process of the target object data based on the encryption of the data content by the computer device, so as to form a complete transmission process of object data, which helps ensure transmission security of end-to-end object data. In an embodiment, the computer device refers to a device where the data transmitter of the target object data is located during the encryption of the target object data, or the computer device may be a device where the corresponding data receiver is located during the decryption of the target object data. In this embodiment of the present disclosure, the computer device may be a server or a smart terminal. When the computer device is the server, the computer device may be a physical server or a virtual server. When the computer device is the physical server, the computer device may be a single server or a server cluster composed of a plurality of servers. When the computer device is the smart terminal, the smart terminal may be a smartphone, a computer, an intelligent voice interaction device, an intelligent home appliance, an on-board terminal, or the like.

In an embodiment, the target object data is object data including the object identifier and the data content. The object identifier included in the target object data is configured to indicate a target object that generates a corresponding data content, and may be configured to uniquely identify the target object. The object identifier may be a social account, a mobile phone number, or the like of the target object. However, any data content generated by the target object may be used as the data content included in the target object data. The data content may be, for example, data such as electronic resource flows of the target object. The data content and the object identifier of the target object data are obtained only after the corresponding target object is known and after an authorization to obtain the data content and object identifier is obtained from the target object. However, when no corresponding authorization is obtained, an operation of obtaining the data content and the object identifier is not performed. In addition, the identity information of the data transmitter and the data receiver is configured for uniquely identifying the data transmitter or the data receiver. The identity information is an identity certificate of the data transmitter or the data receiver. For example, the identity information may specifically be a key certificate of the data transmitter or the data receiver. The shared secret negotiated respectively based on the identity information of the data transmitter and the identity information of the data receiver includes encryption instructions of the data transmitter and decryption instructions of the data receiver. The target object data encrypted based on the encryption instructions may be obtained through decryption by using the decryption instructions. Therefore, the encryption transmission of the target object data between the data transmitter and the data receiver may be implemented based on the shared secret negotiated by the two parties. Since both the encryption instructions and the decryption instructions used during encryption transmission of the target object data between the two parties refer to the identity information of the two parties, security during transmission of the target object data between the two parties may be effectively guaranteed.

Based on the shared secret negotiated by the two parties, the data transmitter may de-identify the object identifier included in the target object data based on the encryption instructions in the shared secret, and encrypt the data content included in the target object data, thereby implementing integration of the de-identification process of the target object data and the content encryption process. In an embodiment, the de-identification refers to mapping object identifiers (such as user IDs) to implement user ID desensitization of the object identifiers, causing a corresponding receiver to be unable to accurately locate a corresponding object subject through obtained user information. In this way, accuracy and security during the transmission of the object data are implemented.

In an embodiment, the data transmitter may be a computer device as indicated by 10 in FIG. 1A, and the data receiver may be any one of the computer devices as indicated by 11 in FIG. 1A. In an embodiment, since the target object data is transmitted from the data transmitter 10 to the data receiver 11, the shared secrets negotiated by the data transmitter 10 and different data receivers are also different. When the same target object data is transmitted from the data transmitter 10 to different data receivers, the object identifier and the object content in the same target object data are both mapped to different mapping data, which ensures data privacy and security of the target object data when being transmitted between the data transmitter and different data receivers, and also avoids a problem that different data receivers infer the received same mapping data and determine a target object corresponding to the mapping data.

In an embodiment, the target object data may be directly transmitted as shown in FIG. 1A during the transmission between the data transmitter and the data receiver. Alternatively, the target object data may also be forwarded through an intermediary. For example, when the data transmitter is a device A, the data receiver is a device B, and the intermediary is a device C, if the device A and the device B cannot directly perform data communication and the device C is needed for data transfer, a shared secret is negotiated by using identity information of device A and identity information of device B during encryption of the target object data. Then even if the encrypted target object data is transferred and forwarded through the device C, the device C cannot obtain the complete identity information of the device A and/or the identity information of the device B. Therefore, after the encrypted target object data during the transfer is transmitted to the device C, the device C cannot decrypt the encrypted data, thereby ensuring data security of the target object data during the transfer.

When the data transmitter and the data receiver implement the transmission of the target object data based on the negotiated shared secret, three stages including a pre-negotiation stage, a de-identification stage regarding the object identifier in the target object data, and a data transmission stage are mainly involved. A relationship among the three stages may be shown in FIG. 1B.

A purpose of the pre-negotiation stage is to negotiate, through a cryptographic means, the identity information required by the share secret between the data transmitter and the data receiver, and distribute the identity information for use in the subsequent two processes. The pre-negotiation process requires participation of both the data transmitter and the data receiver. The pre-negotiation process usually only needs to be performed once. After the pre-negotiation is completed, the operation of the pre-negotiation may be bypassed subsequently, and the subsequent de-identification process and data transmission process are directly performed. In an embodiment, in the de-identification stage regarding the object identifier, the object identifier (such as the user ID) is desensitized mainly based on the pre-negotiated identity information of the two parties and with the cryptographic means supplemented. The process only requires the participation of the data transmitter. In the de-identification stage, in a scenario where the data receiver is not allowed to decode the object identifier (i.e., the object identifier is irreversible), the data receiver cannot decode and recover the object identifier. However, when the data receiver is allowed to decode and recover the object identifier, the data receiver implements the decoding of the object identifier based on relevant information obtained from the data transmitter. In addition, in the data transmission stage, both the data transmitter and the data receiver are needed to participate. The data transmitter generates a derived key, encrypts the data content of the target object data by using the derived key, and transmits encrypted relevant data to the data receiver. The data receiver generates a corresponding recovery key (a decryption key), decrypts the encrypted data by using the generated recovery key, and obtains corresponding decrypted data.

Figure 2:
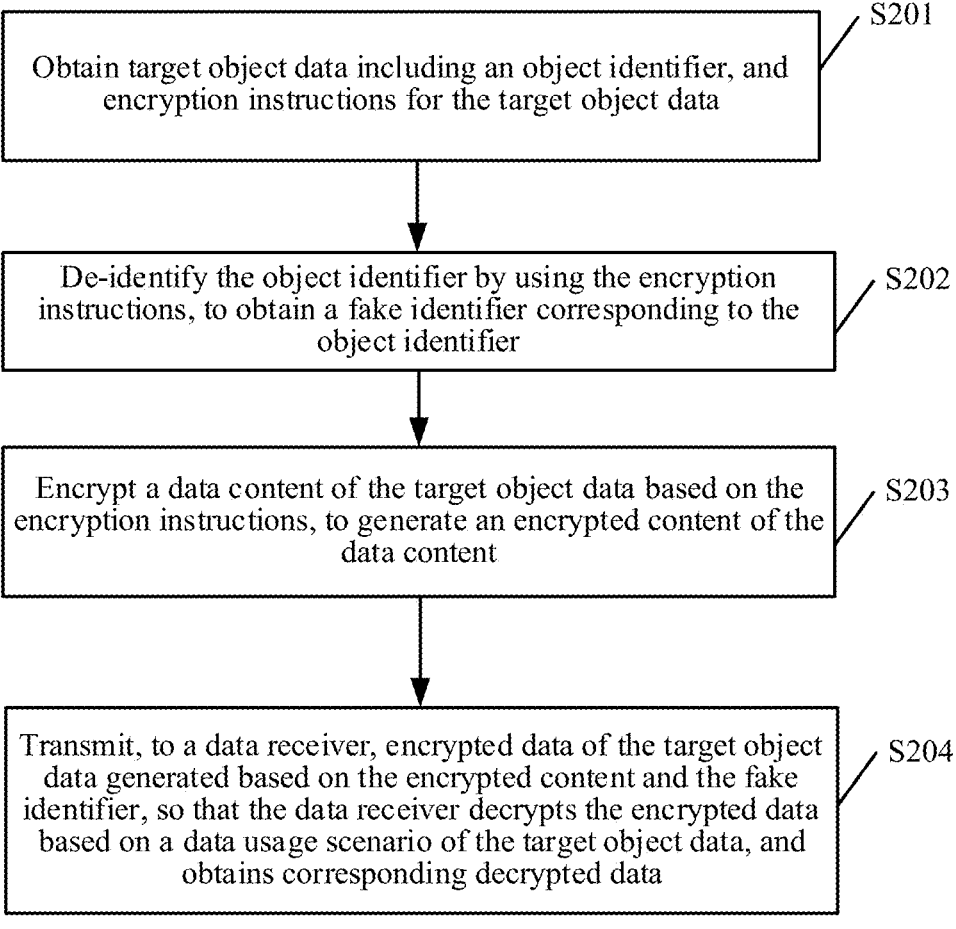
FIG. 2 is a schematic flowchart of a data processing method according to an embodiment of the present disclosure.

The data processing method provided in this embodiment of the present disclosure is described in detail below with reference FIG. 2. The data processing method may be performed by the foregoing computer device. As shown in FIG. 2, the method may include the following operations.

S201: Obtain target object data including an object identifier, and encryption instructions for the target object data.

During transmission of the target object data, the computer device (or a data transmitter) also needs to obtain the encryption instructions for the target object data after obtaining the target object data. The encryption instructions are obtained through negotiation by the data transmitter and a data receiver corresponding to the target object data in a pre-negotiation stage. When the encryption instructions are obtained through negotiation, the data transmitter may first obtain identity information of the data transmitter. The identity information includes public identity information of the data transmitter and specific identity information of the data transmitter. In an embodiment, the public identity information of the data transmitter refers to identity information that needs to be transmitted to the data receiver, so that the data receiver may generate decryption instructions based on the obtained public identity information of the data transmitter. The specific identity information of the data transmitter refers to identity information preserved at the data transmitter that is not to be published or transmitted outwards. In an embodiment, the data transmitter may also obtain public identity information of the data receiver from the data receiver after obtaining the corresponding identity information. The public identity information of the data receiver is obtained from identity information of the data receiver, the identity information of the data receiver also includes the public identity information of the data receiver and specific identity information of the data receiver, and the public identity information of the data receiver is also published to the data receiver after being generated. Then after the data transmitter obtains the public identity information of the data receiver, the encryption instructions may be generated by using a key agreement algorithm and based on the identity information of the data transmitter and the public identity information of the data receiver.

In an embodiment, the identity information of the data transmitter may be an identity certificate. For example, the identity information of the data transmitter may be a first key pair generated by the data transmitter. The first key pair includes a first public key (denoted as Pa) and a first private key (denoted as Sa). The first public key is the public identity information of the data transmitter, and the first private key is the specific identity information of the data transmitter. In addition, the identity information of the data receiver may also be a second key pair generated by the data receiver. A second public key (denoted as Pb) included in the second key pair is used as the public identity information of the data receiver, and a second private key (denoted as Sb) included in the second key pair is used as the specific identity information of the data receiver. The first key pair generated by the data transmitter and the second key pair generated by the data receiver described above may be both generated by the two parties based on a cryptographic means. For example, both the data transmitter and the data receiver may generate a key pair by using an SM2 algorithm (a cryptographic algorithm). Then during the generation of the encryption instructions by the data transmitter, the encryption instructions (denoted as Rk) may be generated based on the first public key Pa, the first private key Sb, and the second public key Pb by using the key agreement algorithm. In an embodiment, the key agreement algorithm may be an ECDH algorithm (a Diffie-Hellman (DH) key exchange algorithm based on elliptic curve cryptosystems (ECCs)). The encryption instructions Rk generated by the data transmitter may be shown in Equation 1:

$$Rk = ECDH(Pa, Sa, Pb) \qquad \text{Equation 1}$$

In an embodiment, to process the object identifier of a target object based on a corresponding data usage scenario (i.e., a scenario in which whether the data receiver is allowed to decode the object identifier) and by using different de-identification processes in the subsequent de-identification stage, in a preceding stage of the de-identification process, for example, in the pre-negotiation stage, the data transmitter is also involved in generation of timestamp information (denoted as time) and a generation process of a random secret factor (denoted as random). The timestamp information and the random secret factor are used by the data transmitter as processing factors for the subsequent de-identification. In this way, when the data transmitter de-identifies the object identifier, reference is made to not only the encryption instructions generated from the identity information of the two parties, but also the timestamp information time and/or a reference random factor (i.e., the random secret factor random), to further ensure identifier security of the object identifier. A pre-negotiation process of a data transmitter and a data receiver is described in detail below with reference to FIG. 3A.

Operation S301 in FIG. 3A: The data transmitter generates an SM2 key pair (a first key pair) including a public key Pa (a first public key) and a private key Sa (a first private key). The data receiver generates an SM2 key pair (a second key pair) including a public key Pb (a second public key) and a private key Sb (a second private key).

Operation S302: The data transmitter generates a timestamp and determines an effective duration corresponding to the timestamp.

Operation S303: Determine whether the data receiver is allowed to recover an original object identifier of a target object, i.e., whether the data receiver is allowed to recover an encrypted object identifier.

Operation S304: If so, two parties exchange respective public key information, and the data transmitter transmits timestamp information and the corresponding effective duration to the data receiver.

Operation S305: If not, the data transmitter generates a random secret factor random. Operation S306: Transmit the timestamp information, the corresponding effective duration, and the random secret factor random to the data receiver.

In the pre-negotiation process, it is mainly the data transmitter and the data receiver of target object data that perform a process of generating required data in the subsequent de-identification stage and the data transmission stage, as well as a process of data exchange of related data. Then after the data transmitter generates identity information thereof in the pre-negotiation stage and obtains public identity information of the data receiver, corresponding encryption instructions may be generated. The generated encryption instructions may be identified by Rk. However, after the data transmitter generates the encryption instructions, an object identifier included in the target object data may be de-identified, and operation S202 may be performed.

S202: De-identify the object identifier by using the encryption instructions, to obtain a fake identifier corresponding to the object identifier.

In an embodiment, during the de-identification of the object identifier included in the target object data by using the encryption instructions in the de-identification stage, the computer device may de-identify the object identifier based on a data usage scenario of the target object data and by using different identifier processing rules. In a specific implementation, the computer device (i.e., a device corresponding to the data transmitter) may first determine the data usage scenario of the target object data. The data usage scenario specifies the identifier processing rules during the de-identification of the object identifier. Then the computer device may also de-identify the object identifier based on the identifier processing rules and using the encryption instructions, to obtain the fake identifier corresponding to the object identifier. In an embodiment, the data usage scenario is configured for describing whether the data receiver is supported to obtain the original object identifier of a target object and perform a process of de-identifying the object identifier, i.e., a process of decrypting the object identifier. The data usage scenario is configured for describing whether the data receiver is supported to decrypt the encrypted object identifier. It may be determined, based on the data usage scenario corresponding to the target object data including the object identifier, whether the data receiver is allowed to obtain the original object identifier of the target object. For example, when the data receiver needs to analyze an object portrait based on the original object identifier, it is determined that the data receiver is allowed to obtain the original object identifier. However, if the data receiver only needs to perform corresponding business based on the data content included in the target object data, it is determined that the data receiver is not allowed to obtain the original object identifier.

Figure 3B:
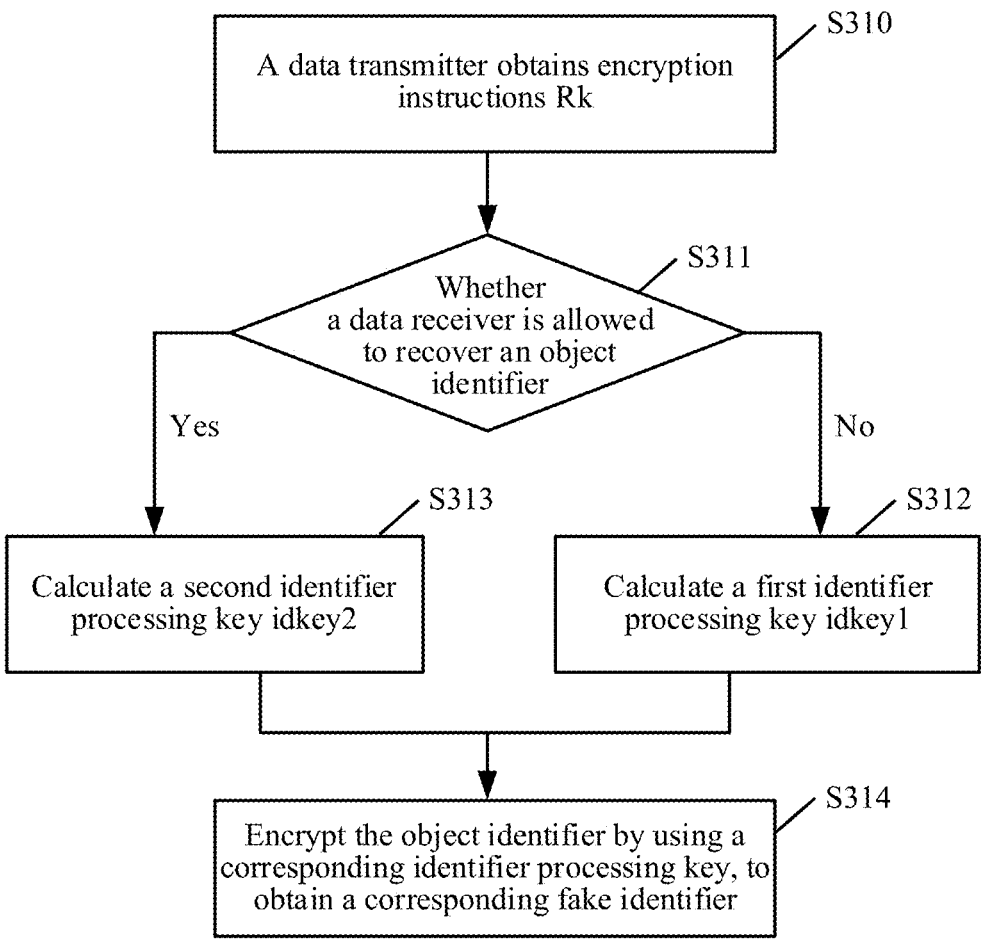
FIG. 3B is a schematic diagram of a de-identification stage according to an embodiment of the present disclosure.

In an embodiment, a process of de-identifying the corresponding object identifier based on the data usage scenario by the data transmitter may be shown in FIG. 3B. After the data transmitter performs generation to obtain the encryption instructions Rk (operation S310), it is determined whether the data usage scenario indicates that the data receiver is allowed (supported) to recover the object identifier (operation S311). If the data usage scenario indicates that the data receiver is not supported to perform decryption to obtain the object identifier of the target object, the data transmitter may use a generated reference random factor (i.e., the random secret factor random generated in operation S305 described above) as a processing factor during the de-identification of the object identifier. In a specific implementation, the data transmitter may generate the timestamp information and the reference random factor random, and then generate a first identifier processing key for performing the de-identification based on the reference random factor, the encryption instructions, and the timestamp information (operation S312). In an embodiment, the data transmitter may generate the first identifier processing key by using a key generation algorithm and based on the reference random factor random, the encryption instructions Rk, and the timestamp information (denoted as time). The key generation algorithm may be a password-based key derivation function 2-SM3 cryptographic hash algorithm-hash-based message authentication code (PBKDF2-SM3-HMAC). An expression of an algorithm for generating the first identifier processing key (denoted as idkey1) based on the key generation algorithm may be shown in Equation 2.

$$idkey1 = PBKDF2\text{-}SM3\text{-}HMAC(\text{time}, Rk, \text{random}) \qquad \text{Equation 2}$$

Based on the first identifier processing key determined by the data transmitter, the data transmitter may encrypt the object identifier (denoted as id) by using the first identifier processing key idkey1, and use the encrypted object identifier as a fake identifier (denoted as fakeid) of the object identifier (operation S314). When the data transmitter encrypts the object identifier id by using the first identifier processing key idkey1, a corresponding encryption algorithm (such as an SM4 algorithm) may also be used, which may be specifically shown in Equation 3.

$$fakeid = SM4(id, idkey1) \qquad \text{Equation 3}$$

In an embodiment, if the data usage scenario indicates that the data receiver is supported to perform decryption to obtain the object identifier of the target object, a key for performing the de-identification that is determined during the de-identification of the object identifier by the data transmitter is used as a second identifier processing key (denoted as idkey2) (operation S313). The data transmitter may obtain timestamp information time during generation of the second identifier processing key, and then may generate, by using the encryption instructions Rk and the timestamp information time, the second identifier processing key for performing the de-identification, which may be specifically shown in Equation 4.

$$idkey2 = PBKDF2\text{-}SM3\text{-}HMAC(\text{time}, Rk) \qquad \text{Equation 4}$$

Based on the second identifier processing key idkey2 determined by the data transmitter, a process of encrypting the object identifier id by using the second identifier processing key idkey2 by the data transmitter may be shown in Equation 5. The encrypted object identifier is used as the fake identifier of the object identifier (operation S314).

$$fakeid = SM4(id, idkey2) \qquad \text{Equation 5}$$

It may be learned from Equation 2 to Equation 5 described above that when the data usage scenario indicates that the data receiver is not supported to decrypt the object identifier, the data transmitter introduces the reference random factor random as the processing factor during the encryption of the object identifier included in the target object. However, when the data usage scenario indicates that the data receiver is supported to decrypt the object identifier, the reference random factor random is not used as an encryption factor for the object identifier, but only the timestamp information time and the encryption instructions Rk are used as the encryption factor for the object identifier.

Further, based on the foregoing pre-negotiation stage, since the data transmitter has transmitted the timestamp information and the encryption instructions to the data receiver in the pre-negotiation stage, based on symmetry of symmetric encryption, the data receiver may also generate an identifier decryption key equivalent to a second identifier key by using the timestamp information and the encryption instructions obtained from the data transmitter after the data transmitter encrypts the corresponding object identifier by using the second identifier processing key generated from the timestamp information and the encryption instructions. In this way, the data receiver may successfully decrypt the encrypted fake identifier and obtain the original object identifier when the data usage scenario indicates that the data receiver is supported to decrypt the object identifier. However, when the data usage scenario indicates that the data receiver is not supported in decrypting the object identifier, since the data transmitter introduces the reference random factor random as the processing factor for encrypting the object identifier, and does not transmit the reference random factor random to the data receiver, the data receiver cannot implement decryption and recovery of the fake identifier due to lack of the reference random factor.

This embodiment of the present disclosure is different from any existing de-identification process implemented based on fixed mapping. In this embodiment of the present disclosure, a local key (which is the first identifier processing key or the second identifier processing key) for performing the de-identification is jointly derived based on identity information, the timestamp information, and an optional secret factor (the reference random factor random) of the two transmission parties, so that the object identifier may be encrypted by using the derived local key to implement the de-identification of the object identifier. Since the identity information of the two parties is added to a mapping algorithm, different mapping may be established for different transmission scenarios at an algorithm level. In addition, whether the optional secret factor is shared with the data receiver may be decided by the data transmitter depending on an application scenario. When the data transmitter decides to share the optional secret factor with the data receiver, the data receiver may obtain the original object identifier through decryption. When the data transmitter decides not to share the optional secret factor with the data receiver, the data receiver only obtains a completely de-identified object identifier (that is, the fake identifier), which greatly enhances flexibility and security of performing the de-identification.

In an embodiment, an effective duration is also set for the timestamp information generated by the data transmitter. The effective duration may be configured for indicating an effective time range of the identifier processing keys (including the first identifier processing key and the second identifier processing key described above) generated based on the corresponding timestamp information. When the effective duration is reached, the data transmitter may update the timestamp information, and update the corresponding identifier processing key by using updated timestamp information. In an embodiment, the data transmitter may also transmit the updated timestamp information to the data receiver after updating the timestamp information, so that the data receiver performs identifier decryption based on the received updated timestamp information when supported to perform decryption to obtain the object identifier of the target object. Based on the setting of the effective duration of the timestamp information, the encryption factor for the object identifier may be updated and adjusted when the effective duration is reached. However, an encryption mapping relationship of the object identifier may be updated based on the updating and adjustment of the encryption factor corresponding to the object identifier, which also enhances security of de-identifying the corresponding object identifier.

In an embodiment, based on the effective duration set for the timestamp information, an encryption mode of the object identifier may be adjusted based on the effective duration in the same data usage scenario. For example, when all the data usage scenarios support the data receiver to perform decryption to obtain the object identifier of the target object, and the effective duration set for the timestamp information is 1 day, for the object identifier of the same target object, the timestamp information included in the processing factor for encrypting the object identifier on the same day is necessarily different from the timestamp information included in the processing factor for encrypting the object identifier on the next day. In other words, based on the effective duration set for the timestamp information, periodic updating and adjustment are implemented based on the set effective duration during the encryption of the object identifier of the same target object, so as to further improve the security of encrypting the object identifier.

Based on the generation of the encryption instructions by the data transmitter, the data transmitter may also encrypt the data content of the target object based on the encryption instructions. In an embodiment, the de-identification of the object identifier and the encryption of the data content of the target object data by the data transmitter based on the encryption instructions are not performed in sequence, which may be performed in sequence or simultaneously. This is not limited in this embodiment of the present disclosure.

S203: Encrypt a data content of the target object data based on the encryption instructions, to generate an encrypted content of the data content.

Figure 3C:
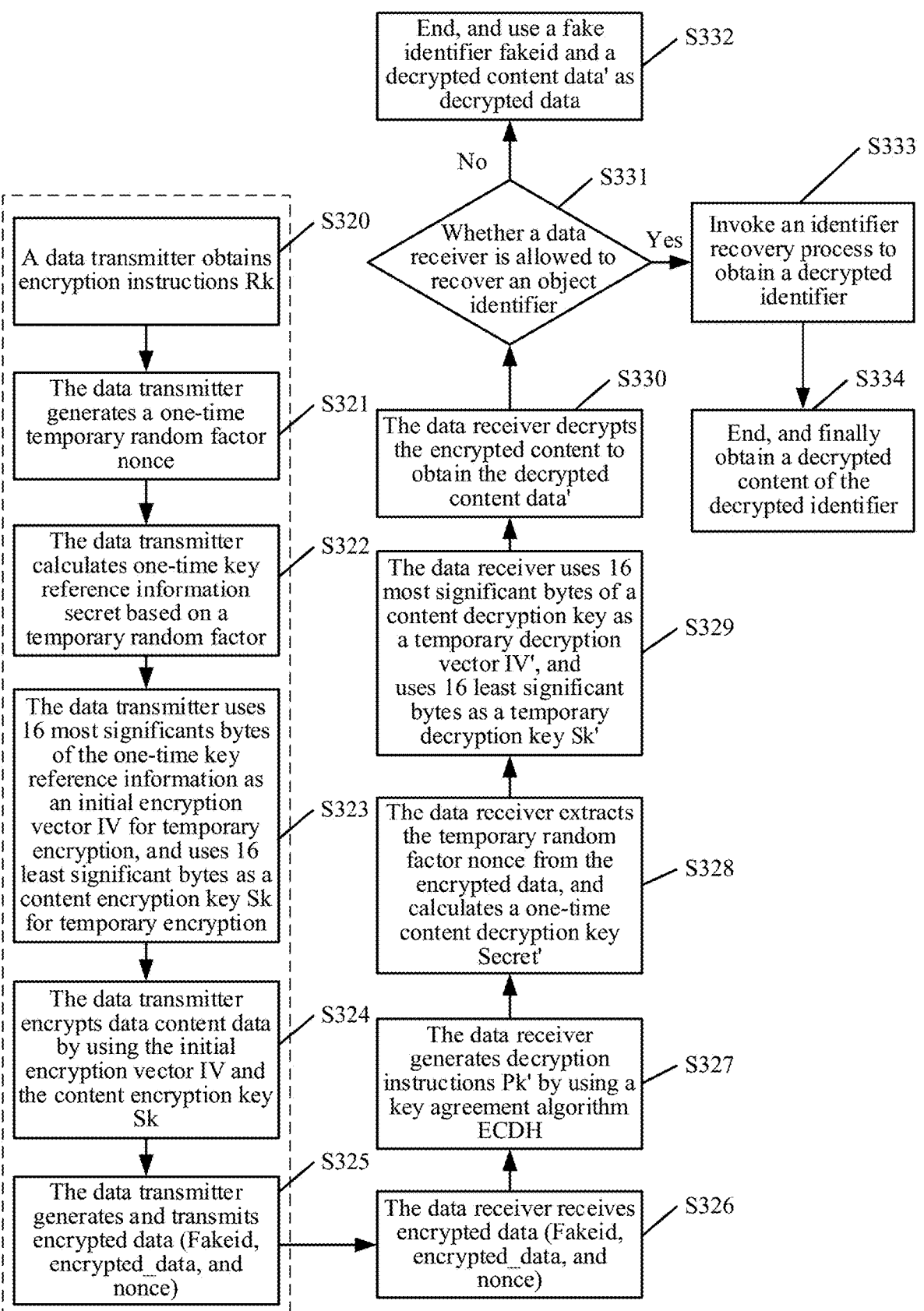
FIG. 3C is a schematic diagram of a data transmission stage according to an embodiment of the present disclosure.

In an embodiment, for a process of encrypting the data content of the target object data by the data transmitter, reference may be made to a part framed by dashed lines in FIG. 3C. After the data transmitter obtains the encryption instructions Rk through generation (operation S320), the data transmitter may first obtain a temporary random factor (denoted as nonce) through generation (operation S321)

during encryption of the data content of the target object by using the encryption instructions. The temporary random factor nonce obtained by the data transmitter is a one-time random number. After the data of the target object data is encrypted/decrypted by using the temporary random factor nonce, the temporary random factor nonce becomes invalid, which may ensure security of the data content of the target object data. In addition, the temporary random factor and the reference random factor random generated in the pre-negotiation process are two different random numbers. The reference random factor is a non-one-time random number. For example, the reference random factor random is a random number with a relatively long effective time. In other words, during encryption of the data content of the target object data by the data transmitter, a one-time-pad high-intensity end-to-end encryption transmission method may be implemented based on generation of a one-time temporary random factor nonce. However, the one-time pad encryption transmission may implement each rotation of an encryption key for the data content, which can effectively prevent an intermediary from obtaining plaintext of the content data, and further ensure the security of the data content during data transmission.

The data transmitter may generate key reference information secret based on the encryption instructions and the temporary random factor after obtaining the temporary random factor (operation S322). The generated key reference information includes at least two bytes. In an embodiment, the data transmitter may also generate the key reference information secret based on the encryption instructions Rk and the temporary random factor nonce by using the PBKDF2-SM3-HMAC algorithm, which may be specifically shown in Equation 6.

$$\text{Secret} = PBKDF2\text{-}SM3\text{-}HMAC(\text{nonce}, Rk) \qquad \text{Equation 6}$$

In an embodiment, since the key reference information secret is generated by the data transmitter based on the one-time temporary random factor nonce, the key reference information secret generated based on the one-time temporary random factor nonce is also for one-time use. After the data transmitter obtains the key reference information, byte division may be further performed on the at least two bytes included in the key reference information, to obtain an initial encryption vector (denoted as IV) and a content encryption key (denoted as SK). In a specific implementation, since the key reference information obtained by the data transmitter generally includes 32 bytes, the data transmitter may use 16 most significant bytes of the key reference information secret as the initial encryption vector IV, and may use 16 least significant bytes of the key reference information secret as the content encryption key SK when obtaining the initial encryption vector IV and the content encryption key SK based on the byte division (operation S323).

The data transmitter may encrypt the data content of the target object data by using the content encryption key and the initial encryption vector after determining the content encryption key and the initial encryption vector based on the key reference information, to generate an encrypted content of the data content (operation S324). In an embodiment, if the data content of the target object data is denoted as data, and the encrypted content of the data content of the target object data is denoted as encrypted_data, an expression for the encryption of the data content of the target object data based on the content encryption key and the initial encryption vector by the data transmitter may be shown in Equation 7.

$$\text{encrypted\_data} = SM4\_gcm(IV, Sk, \text{data}) \qquad \text{Equation 7}$$

SM4_gcm is a data encryption algorithm. However, after the data transmitter calculates the encrypted content encrypted_data of the target object data, the encrypted data of the target object data may be generated based on the encrypted content encrypted_data, the fake identifier fakeid generated after the object identifier of the target object data is de-identified, and the temporary random factor nonce generated during the encryption of the data content. Therefore, the encrypted data of the target object data generated by the data transmitter may be identified by fakeid, encrypted_data, and nonce.

After the data transmitter generates the encrypted data of the target object data, the encrypted data may be transmitted to the data receiver (operation S325), and then operation S204 may be performed. In an embodiment, since the transmitted data has been encrypted when the data transmitter transmits the generated encrypted data to the data receiver, the data transmitter may directly transmit the generated encrypted data to the data receiver. Alternatively, to further ensure the data security of the encrypted data, the generated encrypted data may also be transmitted to the data receiver based on a secure channel implemented by the secure sockets layer (SSL), to ensure security of the transmitted encrypted data, thereby further ensuring security of the target object data.

S204: Transmit, to a data receiver, encrypted data of the target object data generated based on the encrypted content and the fake identifier, so that the data receiver decrypts the encrypted data based on a data usage scenario of the target object data, and obtains corresponding decrypted data.

After the data transmitter transmits the encrypted data corresponding to the target object data to the data receiver, the data receiver may decrypt the encrypted data based on the data usage scenario for the target object data, and obtain the corresponding decrypted data. A process in which the data receiver decrypts the encrypted data based on the data usage scenario is described in detail below with reference to FIG. 3C.

In an embodiment, the target object data is encrypted by using a symmetric encryption algorithm. Then during the decryption of the encrypted data of the target object data, the data receiver may decrypt the encrypted data by generating a decryption key equivalent to an encryption key in an encryption process. In an embodiment, after the data receiver obtains the encrypted data from the data transmitter (operation S326), the data receiver may obtain public identity information of the data transmitter from the data transmitter during decryption of the encrypted data based on the data usage scenario. Identity information generated by the data receiver includes public identity information of the data receiver and specific identity information of the data receiver. The corresponding public identity information obtained by the data receiver from the data transmitter may be a first public key Pa generated by the data transmitter. However, based on the obtained first public key Pa, the data receiver may further generate decryption instructions Rk' by using a key negotiation algorithm and based on the public identity information (i.e., the first public key Pa) of the data transmitter and the identity information of the data receiver (operation S327). The identity information of the data receiver includes a second public key pb and a second private key Sb of a second key pair generated by the data receiver. Based on symmetry of the symmetric encryption algorithm and a key pair pre-negotiation process performed by the two parties, the decryption instructions generated by the data receiver is equivalent to the encryption instructions generated by the data transmitter. In other words, decryption of the encryption instructions Rk generated by the data transmitter may be implemented by using the decryption instructions Rk' generated by the data receiver. The generation of the decryption instructions Rk' generated by the data receiver may also be implemented based on the foregoing key agreement algorithm ECDH, which may be specifically shown in Equation 8.

$$Rk' = ECDH(Pb, Sb, Pa) \qquad \text{Equation 8}$$

After the data receiver obtains the decryption instructions, the encrypted data may be decrypted by using the decryption instructions and based on the data usage scenario of the target object data. In an embodiment, the decryption instructions Rk' obtained by the data receiver is configured for decrypting the encrypted content included in the encrypted data. During the decryption of the encrypted content in the encrypted data by the data receiver by using the decryption instructions, since the encrypted data of the target object data includes the temporary random factor nonce generated during the encryption of the data content, the data receiver may first extract the temporary random factor nonce from the encrypted data (fakeid, encrypted_data, and nonce) in operation S328. Then equivalent information of the key reference information may be generated by using the temporary random factor nonce and the decryption instructions Rk'. Next, in operation S328, the data receiver also generates the equivalent information (denoted as Secret') equivalent to the key reference information secret based on the symmetry of the symmetric encryption algorithm and the pre-negotiation process of the two parties (operation S328). Then the decryption of the encrypted content encrypted based on the key reference information secret may be implemented. A process in which the data receiver generates the equivalent information Secret' of the key reference information may be shown in Equation 9.

$$Secret' = PBKDF2\text{-}SM3\text{-}HMAC(nonce, Rk') \qquad \text{Equation 9}$$

After the data receiver determines the equivalent information Secret' of the reference key message, a decryption vector IV' and a content decryption key Sk' may be determined from the at least two bytes included in the equivalent information (operation S329). Then the data receiver decrypts the encrypted content by using the decryption vector IV' and the content decryption key Sk', to obtain a decrypted content data' of the encrypted content (operation S330). In an embodiment, when the data receiver determines the decryption vector IV' and the content decryption key Sk' from the equivalent information Secret' of the reference key information, 16 most significant bytes of the equivalent information Secret' may also be used as the decryption vector IV', and 16 least significant bytes of the equivalent information Secret' may be used as the content decryption key Sk'. An algorithm expression for the data receiver to decrypt the encrypted content by using the decryption vector IV' and the content decryption key Sk' may be shown in Equation 10.

$$data' = SM4\_gcm(IV', Sk', encrypted\_data) \qquad \text{Equation 10}$$

data' refers to the decrypted content obtained after the encrypted content is decrypted. In general, the decrypted content data' obtained after the data receiver decrypts the encrypted content is identical to original data content data (i.e., data content data before the encryption/decryption process is performed) included in the target object data. Therefore, after the data receiver obtains the decrypted content corresponding to the encrypted content, receiving of the data content data is completed.

After the data receiver completes receiving the data content of the target object data, the data receiver may further decrypt the object identifier corresponding to the target object data based on the data usage scenario for the target object data. In an embodiment, it is determined whether the data receiver is allowed to recover the object identifier in operation S331. If the data receiver determines that the data usage scenario indicates that the data receiver is not supported to perform decryption to obtain the object identifier of a target object (the data receiver is not allowed to recover the object identifier), the data receiver may extract the fake identifier fakeid from the encrypted data after obtaining the decrypted content of the encrypted content, and then may use the decrypted content data' and the extracted fake identifier fakeid as the decrypted data of the encrypted data (operation S332). In another implementation, if the data usage scenario indicates that the data receiver is supported to perform decryption to obtain the object identifier of the target object (the data receiver is allowed to recover the object identifier), the data receiver may decrypt the fake identifier fakeid included in the encrypted data after obtaining the decrypted content of the encrypted content, to obtain a decryption identifier (denoted as id') corresponding to the fake identifier (operation S333). In this way, the decrypted content of the decrypted identifier may also be obtained (operation S334). The decryption identifier and the decrypted content are used as the decrypted data of the encrypted data.

Figure 3D:
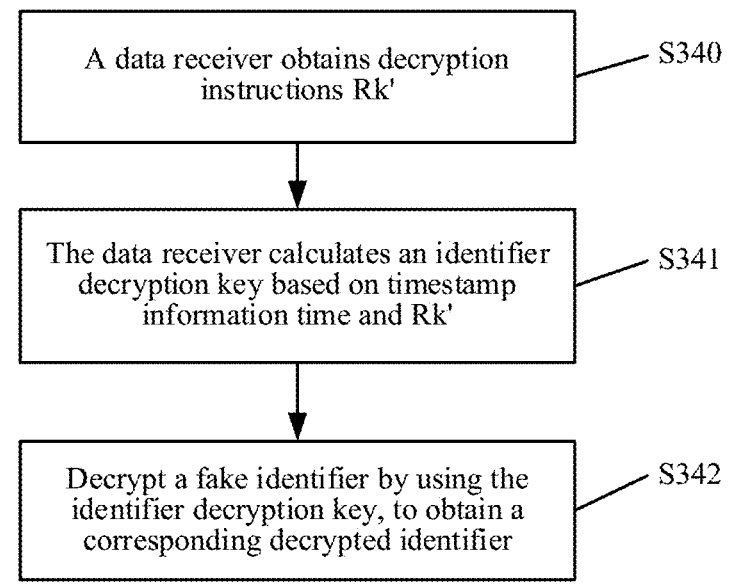
FIG. 3D is a schematic diagram of identifier recovery according to an embodiment of the present disclosure.

A process of decrypting the fake identifier included in the encrypted data by the data receiver is described below with reference to FIG. 3D. Since the data receiver has obtained timestamp information time from the data transmitter during pre-negotiation, and has obtained the decryption instructions Rk' (operation S340), the data receiver may first generate an identifier decryption key based on the timestamp information time and the decryption instructions Rk' during the decryption of the fake identifier fakeid included in the encrypted data (operation S341). The identifier decryption key generated by the data receiver is equivalent to a second identifier processing key. If the identifier decryption key is denoted as idkey', a process of generating the identifier decryption key idkey' may be shown in Equation 11.

$$idkey' = PBKDF2\text{-}SM3\text{-}HMAC(time, Rk') \qquad \text{Equation 11}$$

After obtaining the identifier decryption key, the data receiver may decrypt the fake identifier included in the encrypted data by using the identifier decryption key idkey', and obtain the corresponding decryption identifier (operation S342). An expression for obtaining the decryption identifier may be shown in Equation 12.

$$id' = SM4(fakeid, idkey') \qquad \text{Equation 12}$$

In an embodiment, the cryptographic algorithms such as SM2, SM4, and PBKDF2-SM3-HMAC mentioned above may be replaced with cryptographic algorithms of the same type. For example, the cryptographic algorithms may be replaced with any one or more of a secure hash algorithm 256 (SHA-256), an advanced encryption standard (AES) algorithm, and a PBKDF2-SHA256-HMAC algorithm (another cryptographic algorithm). Based on characteristics of the symmetric encryption algorithm, to ensure that the data receiver successfully calculates each decryption key equivalent to the encryption key in the encryption process, the cryptographic algorithms used during the encryption and decryption of the same data are the same. If the encryption algorithm adopted during the encryption of the object identifier of the target object data includes the SM2 algorithm, the decryption algorithm adopted by the data receiver during the encryption of the encrypted fake identifier also necessarily includes the SM2 algorithm.

In this embodiment of the present disclosure, the computer device may determine encryption instructions about a target object based on identity information of target object data after obtaining the target object data including an object identifier. Then the computer device may de-identify object data included in the target object data by using the encryption instructions and based on a data usage scenario of the target object data, and obtain a corresponding fake identifier. The computer device encrypts a data content of the target object data by using the encryption instructions, to generate an encrypted content of the data content. Then the computer device may transmit, to a data receiver, encrypted data of the target object data generated based on the encrypted content and the fake identifier, so that the data receiver decrypts the encrypted data based on the corresponding data usage scenario and obtains corresponding decrypted data. Through the foregoing process, the computer device implements integration of the de-identification process and the encryption transmission process for the data content, so as to form a complete cross-domain transmission scheme regarding the object data. Moreover, in the cross-domain transmission scheme of this embodiment of the present disclosure, parameter information required for the de-identification and the encryption of the data content is determined at one time during pre-negotiation, which may improve efficiency of subsequent processing and transmission while ensuring security of subsequent data transmission. In addition, during the encryption of the data content of the target object data by the computer device, encryption parameters are all one-time parameters, which implements an encryption capability of a one-time pad for the data content. However, at a level of the object identifier, in an actual business use process, since the data receiver often needs to implement a business logic through identifier mapping, i.e., a relatively stable identifier mapping relationship is required, a mapping relationship of the one-time pad is not used. In addition, to prevent an effect of the de-identification and the security from being affected as a result of long-term use of a fixed mapping relationship for the object identifier, a data transmitter implements fixed updates to timestamp information by introducing the timestamp information as a mapping factor for the object identifier and through negotiation between the two parties on an effective duration of the timestamp information, thereby ensuring privacy of the object identifier. In addition, the data transmitter further introduces a reference random factor random during the encryption of the object identifier, to implement different encryption requirements for the object identifier in different data usage scenarios, so as to further ensure encryption security and transmission security of the target object data.

Figure 4:
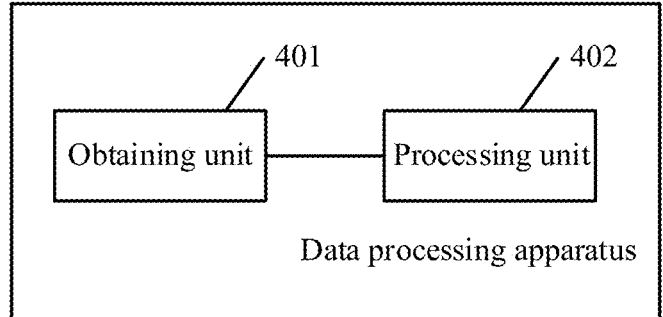
FIG. 4 is a schematic block diagram of a data processing apparatus according to an embodiment of the present disclosure.

Based on the description of the embodiment of the foregoing data processing method, an embodiment of the present disclosure further provides a data processing apparatus. The data processing apparatus may be a computer program (including program code) running in the foregoing computer device. The data processing apparatus may be configured to perform the data processing method shown in FIG. 2. Referring to FIG. 4, the data processing apparatus includes an obtaining unit 401 and a processing unit 402.

The obtaining unit 401 is configured to obtain target object data including an object identifier, and encryption instructions for the target object data.

The processing unit 402 is configured to de-identify the object identifier by using the encryption instructions, to obtain a fake identifier corresponding to the object identifier.

The processing unit 402 is further configured to encrypt a data content of the target object data based on the encryption instructions, to generate an encrypted content of the data content.

The processing unit 402 is further configured to transmit, to a data receiver, encrypted data of the target object data generated based on the encrypted content and the fake identifier, so that the data receiver decrypts the encrypted data based on a data usage scenario of the target object data and obtains corresponding decrypted data.

In an embodiment, the processing unit 402 is further configured to:

determine a data usage scenario of the target object data, the data usage scenario being configured to specify an identifier processing rule during the de-identification of the object identifier; and de-identify the object identifier based on the identifier processing rule and by using the encryption instructions, to obtain the fake identifier corresponding to the object identifier.

In an embodiment, the encryption instructions are obtained after negotiation between a data transmitter and the data receiver of the target object data. The processing unit 402 is further configured to:

obtain identity information of the data transmitter, the identity information including public identity information of the data transmitter and specific identity information of the data transmitter;

obtain public identity information of the data receiver from the data receiver, the public identity information of the data receiver being obtained from identity information of the data receiver; and generate the encryption instructions by using a key agreement algorithm and based on the identity information of the data transmitter and the public identity information of the data receiver.

In an embodiment, if the data usage scenario indicates that the data receiver is not supported to perform decryption to obtain the object identifier of the target object, the processing unit 402 is further configured to:

generate timestamp information and a reference random factor;

generate, based on the reference random factor, the encryption instructions, and the timestamp information, a first identifier processing key for performing the de-identification; and encrypt the object identifier by using the first identifier processing key, and use an encrypted object identifier as the fake identifier of the object identifier.

In an embodiment, if the data usage scenario indicates that the data receiver is supported to perform decryption to obtain the object identifier of the target object, the processing unit 402 is further configured to:

generate timestamp information, and generate, by using the encryption instructions and the timestamp information, a second identifier processing key for performing the de-identification; and encrypt the object identifier based on the second identifier processing key, and use an encrypted object identifier as the fake identifier of the object identifier.

In an embodiment, an effective duration is set for the timestamp information, the effective duration being configured for indicating an effective time range of the identifier processing key generated based on the corresponding timestamp information. The processing unit 402 is further configured to:

update the timestamp information when the effective duration is reached, and update the corresponding identifier processing key by using updated timestamp information, the updated timestamp information being transmitted to the data receiver, so that the data receiver performs identification decryption based on the received timestamp information when supported to perform decryption to obtain the object identifier of the target object.

In an embodiment, the processing unit 402 is further configured to:

generate a temporary random factor, and generate key reference information based on the encryption instructions and the temporary random factor, the key reference information including at least two bytes;

perform byte division on the at least two bytes included in the key reference information, to respectively obtain an initial encryption vector and a content encryption key; and encrypt the data content of the target object data by using the content encryption key and the initial encryption vector, to generate the encrypted content of the data content.

In an embodiment, the obtaining unit 401 is further configured to obtain a temporary random factor generated during the encryption of the data content.

The processing unit 402 is further configured to generate the encrypted data of the target object data based on the encrypted content, the fake identifier, and the temporary random factor.

In an embodiment, a manner in which the data receiver decrypts the encrypted data based on the data usage scenario of the target object data includes:

obtaining, by the data receiver, public identity information of a data transmitter from the data transmitter, identity information generated by the data receiver including public identity information of the data receiver and specific identity information of the data receiver;

generating, by the data receiver, decryption instructions by using a key negotiation algorithm and based on the public identity information of the data transmitter and the identity information of the data receiver, the decryption instructions being equivalent to the encryption instructions; and decrypting, by the data receiver, the encrypted data by using the decryption instructions and based on the data usage scenario of the target object data.

In an embodiment, the decryption instructions are used by the data receiver to decrypt the encrypted content included in the encrypted data. The encrypted data of the target object data further includes: a temporary random factor generated during the encryption of the data content. A manner in which the data receiver decrypts the encrypted content in the encrypted data by using the decryption instructions includes:

extracting, by the data receiver, the temporary random factor from the encrypted data;

generating, by the data receiver, equivalent information of the key reference information by using the temporary random factor and the decryption instructions, and determining a decryption vector and a content decryption key from at least two bytes included in the equivalent information; and decrypting, by the data receiver, the encrypted content by using the decryption vector and the content decryption key, to obtain a decrypted content of the encrypted content.

In an embodiment, when the data usage scenario indicates that the data receiver is not supported to perform decryption to obtain the object identifier of the target object, after the data receiver obtains the decrypted content of the encrypted content, the data receiver extracts a fake identifier from the encrypted data, and uses the decrypted content and the extracted fake identifier as the decrypted data of the encrypted data.

In an embodiment, when the data usage scenario indicates that the data receiver is supported to perform decryption to obtain the object identifier of the target object, after the data receiver obtains the decrypted content of the encrypted content, the data receiver decrypts the fake identifier included in the encrypted data to obtain a decryption identifier corresponding to the fake identifier; and the data receiver uses the encrypted identifier and the decrypted content as the decrypted data of the encrypted data.

In an embodiment, a manner in which the data receiver decrypts the fake identifier included in the encrypted data includes:

obtaining, by the data receiver, timestamp information from the data transmitter, and generating an identifier decryption key by using the timestamp information and the decryption instructions; and decrypting, by the data receiver, the fake identifier included in the encrypted data by using the identifier decryption key.

In an embodiment, the identity information of the data transmitter includes a first key pair generated by the data transmitter, the first key pair including a first public key and a first private key. The first public key is the public identity information of the data transmitter, and the first private key is the specific identity information of the data transmitter, the identity information of the data receiver including a second key pair generated by the data receiver, a second public key included in the second key pair being used as the public identity information of the data receiver, and a second private key included in the second key pair being used as the specific identity information of the data receiver.

In this embodiment of the present disclosure, after the obtaining unit 401 obtains the target object data including the object identifier, the processing unit 402 may determine the encryption instructions regarding the target object based on the identity information of the target object data. Then the processing unit 402 may de-identify object data included in the target object data by using the encryption instructions and based on a data usage scenario of the target object data, and obtain a corresponding fake identifier. The processing unit 402 may encrypt a data content of the target object data by using the encryption instructions, to generate an encrypted content of the data content. Then the processing unit 402 may transmit, to the data receiver, encrypted data of the target object data generated based on the encrypted content and the fake identifier, so that the data receiver decrypts the encrypted data based on the corresponding data usage scenario and obtains corresponding decrypted data. Through the foregoing process, integration of the de-identification process and the encryption transmission process for the data content is implemented, so as to form a complete cross-domain transmission scheme regarding the object data. Moreover, in the cross-domain transmission scheme of this embodiment of the present disclosure, parameter information required for the de-identification and the encryption of the data content is determined at one time during pre-negotiation, which may improve efficiency of subsequent processing and transmission while ensuring security of subsequent data transmission. In addition, during the encryption of the data content of the target object data by the computer device, encryption parameters are all one-time parameters, which implements an encryption capability of a one-time pad for the data content. However, at a level of the object identifier, in an actual business use process, since the data receiver often needs to implement a business logic through identifier mapping, i.e., a relatively stable identifier mapping relationship is required, a mapping relationship of the one-time pad is not used. In addition, to prevent an effect of the de-identification and the security from being affected as a result of long-term use of a fixed mapping relationship for the object identifier, a data transmitter implements fixed updates to timestamp information by introducing the time-stamp information as a mapping factor for the object identifier and through negotiation between the two parties on an effective duration of the timestamp information, thereby ensuring privacy of the object identifier. In addition, the data transmitter further introduces a reference random factor during the encryption of the object identifier, to implement different encryption requirements for the object identifier in different data usage scenarios, so as to further ensure encryption security and transmission security of the target object data.

Figure 5:
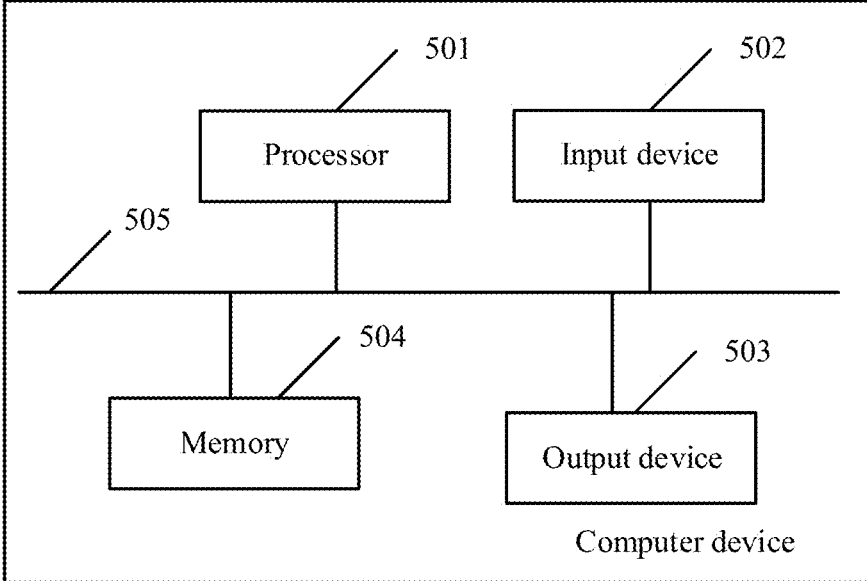
FIG. 5 is a schematic block diagram of a computer device according to an embodiment of the present disclosure.

FIG. 5 is a schematic structural block diagram of a computer device according to an embodiment of the present disclosure. The computer device in this embodiment as shown in FIG. 5 may include one or more processors 501, one or more input devices 502, one or more output devices 503, and a memory 504. The processor 501, the input device 502, the output device 503, and the memory 504 described above are connected through a bus 505. The memory 504 is configured to store a computer program. The computer program includes a program instruction. The processor 501 is configured to execute the program instruction stored in the memory 504.

The memory 504 may include a volatile memory such as a random access memory (RAM). The memory 504 may also include a non-volatile memory, such as a flash memory and a solid-state drive (SSD). The memory 504 may further include a combination of the foregoing types of memories.

The processor 501 may be a central processing unit (CPU). The processor 501 may further include a hardware chip. The foregoing hardware chip may be an application-specific integrated circuit (ASIC), a programmable logic device (PLD), and the like. The PLD may be a field-programmable gate array (FPGA), a generic array logic (GAL), and the like. The processor 501 may also be a combination of the foregoing structures.

In this embodiment of the present disclosure, the memory 504 is configured to store a computer program, the computer program including a program instruction. The processor 501 is configured to execute the program instruction stored in the memory 504, to implement the operations of the corresponding method in FIG. 2 described above.

In an embodiment, the processor 501 is configured to invoke the program instruction to perform operations including:

obtaining target object data including an object identifier, and encryption instructions for the target object data;

de-identifying the object identifier by using the encryption instructions, to obtain a fake identifier corresponding to the object identifier;

encrypting a data content of the target object data based on the encryption instructions, to generate an encrypted content of the data content; and transmitting, to a data receiver, encrypted data of the target object data generated based on the encrypted content and the fake identifier, so that the data receiver decrypts the encrypted data based on a data usage scenario of the target object data and obtains corresponding decrypted data.

In an embodiment, the processor 501 is configured to invoke the program instruction to perform operations including:

obtaining the data usage scenario of the target object data, the data usage scenario being configured to specify an identifier processing rule during the de-identification of the object identifier; and de-identifying the object identifier based on the identifier processing rule and by using the encryption instructions, to obtain the fake identifier corresponding to the object identifier.

In an embodiment, the encryption instructions are obtained after negotiation between a data transmitter and the data receiver of the target object data. The processor 501 is configured to invoke the program instruction to perform operations including:

obtaining identity information of the data transmitter, the identity information including public identity information of the data transmitter and specific identity information of the data transmitter;

obtaining public identity information of the data receiver from the data receiver, the public identity information of the data receiver being obtained from identity information of the data receiver; and generating the encryption instructions by using a key agreement algorithm and based on the identity information of the data transmitter and the public identity information of the data receiver.

In an embodiment, if the data usage scenario indicates that the data receiver is not supported to perform decryption to obtain the object identifier of the target object, the processor 501 is configured to invoke the program instruction to perform operations including:

obtaining timestamp information and a reference random factor;

generating, based on the reference random factor, the encryption instructions, and the timestamp information, a first identifier processing key for performing the de-identification; and encrypting the object identifier by using the first identifier processing key, and using an encrypted object identifier as the fake identifier of the object identifier.

In an embodiment, if the data usage scenario indicates that the data receiver is supported to perform decryption to obtain the object identifier of the target object, the processor 501 is configured to invoke the program instruction to perform operations including:

obtaining timestamp information, and generating, by using the encryption instructions and the timestamp information, a second identifier processing key for performing the de-identification; and encrypting the object identifier based on the second identifier processing key, and using an encrypted object identifier as the fake identifier of the object identifier.

In an embodiment, an effective duration is set for the timestamp information, the effective duration being configured for indicating an effective time range of the identifier processing key generated based on the corresponding timestamp information. The processor 501 is configured to invoke the program instruction to perform operations including:

updating the timestamp information when the effective duration is reached, and updating the corresponding identifier processing key by using updated timestamp information, the updated timestamp information being transmitted to the data receiver, so that the data receiver performs identification decryption based on the received timestamp information when supported to perform decryption to obtain the object identifier of the target object.

In an embodiment, the processor 501 is configured to invoke the program instruction to perform operations including:

obtaining a temporary random factor, and generating key reference information based on the encryption instructions and the temporary random factor, the key reference information including at least two bytes;

performing byte division on the at least two bytes included in the key reference information, to respectively obtain an initial encryption vector and a content encryption key; and encrypting the data content of the target object data by using the content encryption key and the initial encryption vector, to generate the encrypted content of the data content.

In an embodiment, the processor 501 is configured to invoke the program instruction to perform operations including:

obtaining a temporary random factor generated during the encryption of the data content; and generating the encrypted data of the target object data based on the encrypted content, the fake identifier, and the temporary random factor.

In an embodiment, a manner in which the data receiver decrypts the encrypted data based on the data usage scenario of the target object data includes:

obtaining, by the data receiver, public identity information of a data transmitter from the data transmitter, identity information generated by the data receiver including public identity information of the data receiver and specific identity information of the data receiver;

generating, by the data receiver, decryption instructions by using the key negotiation algorithm and based on the public identity information of the data transmitter and the identity information of the data receiver, the decryption instructions being equivalent to the encryption instructions; and decrypting, by the data receiver, the encrypted data by using the decryption instructions and based on the data usage scenario of the target object data.

In an embodiment, the decryption instructions are used by the data receiver to decrypt the encrypted content included in the encrypted data. The encrypted data of the target object data further includes a temporary random factor generated during the encryption of the data content. A manner in which the data receiver decrypts the encrypted content in the encrypted data by using the decryption instructions includes:

extracting, by the data receiver, the temporary random factor from the encrypted data;

generating, by the data receiver, equivalent information of the key reference information by using the temporary random factor and the decryption instructions, and determining a decryption vector and a content decryption key from at least two bytes included in the equivalent information; and decrypting, by the data receiver, the encrypted content by using the decryption vector and the content decryption key, to obtain a decrypted content of the encrypted content.

In an embodiment, when the data usage scenario indicates that the data receiver is not supported to perform decryption to obtain the object identifier of the target object, after the data receiver obtains the decrypted content of the encrypted content, the data receiver extracts a fake identifier from the encrypted data, and uses the decrypted content and the extracted fake identifier as the decrypted data of the encrypted data.

In an embodiment, when the data usage scenario indicates that the data receiver is supported to perform decryption to obtain the object identifier of the target object, after the data receiver obtains the decrypted content of the encrypted content, the data receiver decrypts the fake identifier included in the encrypted data to obtain a decryption identifier corresponding to the fake identifier; and the data receiver uses the encrypted identifier and the decrypted content as the decrypted data of the encrypted data.

In an embodiment, a manner in which the data receiver decrypts the fake identifier included in the encrypted data includes:

obtaining, by the data receiver, timestamp information from the data transmitter, and generating an identifier decryption key by using the timestamp information and the decryption instructions; and decrypting, by the data receiver, the fake identifier included in the encrypted data by using the identifier decryption key.

In an embodiment, the identity information of the data transmitter includes a first key pair generated by the data transmitter, the first key pair including a first public key and a first private key. The first public key is the public identity information of the data transmitter, and the first private key is the specific identity information of the data transmitter, the identity information of the data receiver including a second key pair generated by the data receiver, a second public key included in the second key pair being used as the public identity information of the data receiver, and a second private key included in the second key pair being used as the specific identity information of the data receiver.

As disclosed, the computer device may determine encryption instructions about a target object based on identity information of target object data after obtaining the target object data including an object identifier. Then the computer device may de-identify object data included in the target object data by using the encryption instructions and based on a data usage scenario of the target object data, and obtain a corresponding fake identifier. The computer device encrypts a data content of the target object data by using the encryption instructions, to generate an encrypted content of the data content. Then the computer device may transmit, to a data receiver, encrypted data of the target object data generated based on the encrypted content and the fake identifier, so that the data receiver decrypts the encrypted data based on the corresponding data usage scenario and obtains corresponding decrypted data. Through the foregoing process, the computer device implements integration of the de-identification process and the encryption transmission process for the data content, so as to form a complete cross-domain transmission scheme regarding the object data. Moreover, in the cross-domain transmission scheme of this embodiment of the present disclosure, parameter information required for the de-identification and the encryption of the data content is determined at one time during pre-negotiation, which may improve efficiency of subsequent processing and transmission while ensuring security of subsequent data transmission. In addition, during the encryption of the data content of the target object data by the computer device, encryption parameters are all one-time parameters, which implements an encryption capability of a one-time pad for the data content. However, at a level of the object identifier, in an actual business use process, since the data receiver often needs to implement a business logic through identifier mapping, i.e., a relatively stable identifier mapping relationship is required, a mapping relationship of the one-time pad is not used. In addition, to prevent an effect of the de-identification and the security from being affected as a result of long-term use of a fixed mapping relationship for the object identifier, a data transmitter implements fixed updates to timestamp information by introducing the timestamp information as a mapping factor for the object identifier and through negotiation between the two parties on an effective duration of the timestamp information, thereby ensuring privacy of the object identifier. In addition, the data transmitter further introduces a reference random factor during the encryption of the object identifier, to implement different encryption requirements for the object identifier in different data usage scenarios, so as to further ensure encryption security and transmission security of the target object data.

An embodiment of the present disclosure provides a computer program product or a computer program, the computer program product or the computer program including a computer instruction, the computer instruction being stored in a computer-readable storage medium. The processor of the computer device reads the computer instruction from the computer-readable storage medium. The processor executes the computer instruction, so that the computer device performs the method embodiment shown in FIG. 2.

The computer-readable storage medium may be a magnetic disk, an optical disk, a read-only memory (ROM), a RAM, or the like.

The term unit (and other similar terms such as subunit, module, submodule, etc.) in the present disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

What has been disclosed above is merely partial embodiments of the present disclosure, and are not intended to limit the scope of protection of the present disclosure. A person of ordinary skill in the art may understand all or some processes of the foregoing embodiments, and equivalent modifications made according to the claims of the present disclosure still fall within the scope of the present disclosure.

What is claimed is:

1. A data processing method, comprising:

obtaining target object data comprising an object identifier, and encryption instructions for the target object data;

de-identifying the object identifier by using the encryption instructions, to obtain a fake identifier corresponding to the object identifier;

generating a temporary random factor;

generating key reference information based on the encryption instructions and the temporary random factor, the key reference information comprising at least two bytes;

performing byte division on the at least two bytes comprised in the key reference information, to respectively obtain an initial encryption vector and a content encryption key;

encrypting a data content of the target object data based on the content encryption key and the initial encryption vector, to generate an encrypted content of the data content; and transmitting, to a data receiver, encrypted data of the target object data generated based on the encrypted content and the fake identifier, so that the data receiver decrypts the encrypted data based on a data usage scenario of the target object data and obtains corresponding decrypted data.

2. The method according to claim 1, wherein de-identifying the object identifier by using the encryption instructions, to obtain the fake identifier corresponding to the object identifier comprises:

determining a data usage scenario of the target object data, the data usage scenario being configured to specify an identifier processing rule during the de-identification of the object identifier; and de-identifying the object identifier based on the identifier processing rule and by using the encryption instructions, to obtain the fake identifier corresponding to the object identifier.

3. The method according to claim 1, wherein the encryption instructions are obtained after negotiation between a data transmitter and the data receiver of the target object data, obtaining the encryption instructions through negotiation comprising:

obtaining identity information of the data transmitter, the identity information comprising public identity information of the data transmitter and specific identity information of the data transmitter;

obtaining public identity information of the data receiver from the data receiver, the public identity information of the data receiver being obtained from identity information of the data receiver; and generating the encryption instructions by using a key agreement algorithm and based on the identity information of the data transmitter and the public identity information of the data receiver.

4. The method according to claim 2, wherein if the data usage scenario indicates that the data receiver is not supported to perform decryption to obtain the object identifier of a target object, de-identifying the object identifier based on the identifier processing rule and by using the encryption instructions, to obtain the fake identifier corresponding to the object identifier comprises:

generating timestamp information and a reference random factor;

generating, based on the reference random factor, the encryption instructions, and the timestamp information, a first identifier processing key for performing the de-identification; and encrypting the object identifier by using the first identifier processing key, and using an encrypted object identifier as the fake identifier of the object identifier.

5. The method according to claim 2, wherein if the data usage scenario indicates that the data receiver is supported to perform decryption to obtain the object identifier of a target object, de-identifying the object identifier based on the identifier processing rule and by using the encryption instructions, to obtain the fake identifier corresponding to the object identifier comprises:

generating timestamp information, and generating, by using the encryption instructions and the timestamp information, a second identifier processing key for performing the de-identification; and encrypting the object identifier based on the second identifier processing key, and using an encrypted object identifier as the fake identifier of the object identifier.

6. The method according to claim 4, wherein an effective duration is set for the timestamp information, the effective duration being configured for indicating an effective time range of the identifier processing key generated based on the corresponding timestamp information, the method further comprising:

updating the timestamp information when the effective duration is reached, and updating the corresponding identifier processing key by using updated timestamp information, the updated timestamp information being transmitted to the data receiver, so that the data receiver performs identification decryption based on the received timestamp information when supported to perform decryption to obtain the object identifier of the target object.

7. The method according to claim 5, wherein an effective duration is set for the timestamp information, the effective duration being configured for indicating an effective time range of the identifier processing key generated based on the corresponding timestamp information, the method further comprising:

updating the timestamp information when the effective duration is reached, and updating the corresponding identifier processing key by using updated timestamp information, the updated timestamp information being transmitted to the data receiver, so that the data receiver performs identification decryption based on the received timestamp information when supported to perform decryption to obtain the object identifier of the target object.

8. The method according to claim 1, further comprising:

obtaining a temporary random factor generated during the encryption of the data content; and generating the encrypted data of the target object data based on the encrypted content, the fake identifier, and the temporary random factor.

9. The method according to claim 1, wherein that the data receiver decrypts the encrypted data based on the data usage scenario of the target object data comprises:

obtaining, by the data receiver, public identity information of a data transmitter from the data transmitter, identity information generated by the data receiver comprising public identity information of the data receiver and specific identity information of the data receiver;

generating, by the data receiver, decryption instructions by using a key negotiation algorithm and based on the public identity information of the data transmitter and the identity information of the data receiver, the decryption instructions being equivalent to the encryption instructions; and decrypting, by the data receiver, the encrypted data by using the decryption instructions and based on the data usage scenario of the target object data.

10. The method according to claim 9, wherein the decryption instructions is used by the data receiver to decrypt the encrypted content comprised in the encrypted data, the encrypted data of the target object data further comprising a temporary random factor generated during the encryption of the data content, and a manner in which the data receiver decrypts the encrypted content in the encrypted data by using the decryption instructions comprising:

extracting, by the data receiver, the temporary random factor from the encrypted data;

generating, by the data receiver, equivalent information of the key reference information by using the temporary random factor and the decryption instructions, and determining a decryption vector and a content decryption key from at least two bytes comprised in the equivalent information; and decrypting, by the data receiver, the encrypted content by using the decryption vector and the content decryption key, to obtain a decrypted content of the encrypted content.

11. The method according to claim 10, wherein when the data usage scenario indicates that the data receiver is not supported to perform decryption to obtain the object identifier of a target object, after the data receiver obtains the decrypted content of the encrypted content, the data receiver extracts a fake identifier from the encrypted data, and uses the decrypted content and the extracted fake identifier as the decrypted data of the encrypted data.

12. The method according to claim 10, wherein when the data usage scenario indicates that the data receiver is supported to perform decryption to obtain the object identifier of a target object, after the data receiver obtains the decrypted content of the encrypted content, the data receiver decrypts the fake identifier comprised in the encrypted data to obtain a decryption identifier corresponding to the fake identifier; and the data receiver uses the encrypted identifier and the decrypted content as the decrypted data of the encrypted data.

13. The method according to claim 12, wherein that the data receiver decrypts the fake identifier comprised in the encrypted data comprises:

obtaining, by the data receiver, timestamp information from the data transmitter, and generating an identifier decryption key by using the timestamp information and the decryption instructions; and decrypting, by the data receiver, the fake identifier comprised in the encrypted data by using the identifier decryption key.

14. The method according to claim 3, wherein the identity information of the data transmitter comprises a first key pair generated by the data transmitter, the first key pair comprising a first public key and a first private key, the first public key being the public identity information of the data transmitter, and the first private key being the specific identity information of the data transmitter; and the identity information of the data receiver comprising a second key pair generated by the data receiver, a second public key comprised in the second key pair being used as the public identity information of the data receiver, and a second private key comprised in the second key pair being used as the specific identity information of the data receiver.

15. A computer device, comprising at least one processor, an input device, an output device, and a memory, the at least one processor, the input device, the output device, and the memory being connected to each other, the memory being configured to store a computer program, the computer program comprising a program instruction, and the at least one processor being configured to invoke the program instruction to perform:

obtaining target object data comprising an object identifier, and encryption instructions for the target object data;

de-identifying the object identifier by using the encryption instructions, to obtain a fake identifier corresponding to the object identifier;

generating a temporary random factor;

generating key reference information based on the encryption instructions and the temporary random factor, the key reference information comprising at least two bytes;

performing byte division on the at least two bytes comprised in the key reference information, to respectively obtain an initial encryption vector and a content encryption key:

encrypting a data content of the target object data based on the content encryption key and the initial encryption vector, to generate an encrypted content of the data content; and transmitting, to a data receiver, encrypted data of the target object data generated based on the encrypted content and the fake identifier, so that the data receiver decrypts the encrypted data based on a data usage scenario of the target object data and obtains corresponding decrypted data.

16. The computer device according to claim 15, wherein the at least one processor is further configured to perform:

determining a data usage scenario of the target object data, the data usage scenario being configured to specify an identifier processing rule during the de-identification of the object identifier; and de-identifying the object identifier based on the identifier processing rule and by using the encryption instructions, to obtain the fake identifier corresponding to the object identifier.

17. The computer device according to claim 15, wherein the encryption instructions are obtained after negotiation between a data transmitter and the data receiver of the target object data, and the at least one processor is further configured to perform:

obtaining identity information of the data transmitter, the identity information comprising public identity information of the data transmitter and specific identity information of the data transmitter;

obtaining public identity information of the data receiver from the data receiver, the public identity information of the data receiver being obtained from identity information of the data receiver; and generating the encryption instructions by using a key agreement algorithm and based on the identity information of the data transmitter and the public identity information of the data receiver.

18. The computer device according to claim 16, wherein if the data usage scenario indicates that the data receiver is not supported to perform decryption to obtain the object identifier of a target object, and the at least one processor is further configured to perform:

generating timestamp information and a reference random factor;

generating, based on the reference random factor, the encryption instructions, and the timestamp information, a first identifier processing key for performing the de-identification; and encrypting the object identifier by using the first identifier processing key, and using an encrypted object identifier as the fake identifier of the object identifier.

19. A non-transitory computer-readable storage medium containing a computer program, the computer program comprising a program instruction that, when being executed, causes one or more processors to perform:

obtaining target object data comprising an object identifier, and encryption instructions for the target object data;

de-identifying the object identifier by using the encryption instructions, to obtain a fake identifier corresponding to the object identifier;

generating a temporary random factor;

generating key reference information based on the encryption instructions and the temporary random factor, the key reference information comprising at least two bytes;

performing byte division on the at least two bytes comprised in the key reference information, to respectively obtain an initial encryption vector and a content encryption key;

encrypting a data content of the target object data based on the content encryption key and the initial encryption vector, to generate an encrypted content of the data content; and transmitting, to a data receiver, encrypted data of the target object data generated based on the encrypted content and the fake identifier, so that the data receiver decrypts the encrypted data based on a data usage scenario of the target object data and obtains corresponding decrypted data.

* * * * *